US012754501B2

(12) United States Patent
Iwasaki

(10) Patent No.: US 12,754,501 B2
(45) Date of Patent: Oct. 6, 2026

(54) POWER SUPPLY DEVICE PROVIDED IN IMAGE FORMATION DEVICE

(71) Applicant: Nichicon Corporation, Kyoto (JP)

(72) Inventor: Yasuhiro Iwasaki, Kyoto (JP)

(73) Assignee: Nichicon Corporation, Kyoto (JP)

( * ) Notice: Subject to any disclaimer, the term of this patent is extended or adjusted under 35 U.S.C. 154(b) by 0 days.

(21) Appl. No.: 19/130,922

(22) PCT Filed: Oct. 20, 2023

(86) PCT No.: PCT/JP2023/037962

§ 371 (c)(1),
(2) Date: May 16, 2025

(87) PCT Pub. No.: WO2024/106133

PCT Pub. Date: May 23, 2024

(65) Prior Publication Data

US 2026/0186437 A1 Jul. 2, 2026

(30) Foreign Application Priority Data

Nov. 18, 2022 (JP) ................................ 2022-185086

(51) Int. Cl.
*G03G 15/20* (2006.01)
*G03G 15/00* (2006.01)

(52) U.S. Cl.
CPC ....... *G03G 15/5004* (2013.01); *G03G 15/205* (2013.01); *G03G 15/80* (2013.01); *G03G 2215/00978* (2013.01)

(58) Field of Classification Search
CPC .. G03G 15/80; G03G 15/205; G03G 15/2039; G03G 15/5004
See application file for complete search history.

(56) References Cited

U.S. PATENT DOCUMENTS

2012/0000897 A1 1/2012 Shimura
2013/0195497 A1* 8/2013 Shimura ............... G03G 15/80 399/88

(Continued)

FOREIGN PATENT DOCUMENTS

JP 2011234454 A * 11/2011
JP 2012-13999 A 1/2012

(Continued)

*Primary Examiner* — Thomas S Giampaolo, II
(74) *Attorney, Agent, or Firm* — Hodgson Russ LLP

(57) ABSTRACT

The present invention provides a power supply device 10A capable of achieving power savings in an image formation device without sacrificing necessary noise removal. The power supply device 10A includes a filter portion 20, a main power supply portion 30 configured to supply power to an image formation portion 50 using alternating current power supplied via the filter portion 20, and a heater power supply portion 40 configured to supply power to a fixing heater portion 51 using the alternating current power supplied via the filter portion 20. The filter portion 20 includes common lines 21a and 21b, first branch lines 22a and 22b connecting the common lines and the main power supply portion 30, second branch lines 23a and 23b connecting the common lines and the heater power supply portion 40 in a disconnectable manner, a first X capacitor C1 provided between the common lines, a second X capacitor C2 provided between the first branch lines in a disconnectable manner, and a third X capacitor C3 provided between the second branch lines and configured to be disconnected from the common lines along with the heater power supply portion 40.

7 Claims, 4 Drawing Sheets

(56) References Cited

U.S. PATENT DOCUMENTS

| | | | | |
|---|---|---|---|---|
| 2017/0075289 | A1 * | 3/2017 | Shimura | ............ G03G 15/2039 |
| 2021/0026287 | A1 | 1/2021 | Shimazoe et al. | |

FOREIGN PATENT DOCUMENTS

| | | | | | |
|---|---|---|---|---|---|
| JP | 2012-27398 | A | | 2/2012 | |
| JP | 2016073015 | A | * | 5/2016 | .............. H02M 1/32 |
| JP | 2021-21764 | A | | 2/2021 | |
| JP | 2022-129388 | A | | 9/2022 | |

* cited by examiner

POWER SUPPLY DEVICE PROVIDED IN IMAGE FORMATION DEVICE

TECHNICAL FIELD

The present invention relates to power supply devices provided in image formation devices, particularly to a power supply device contributing to power savings in an image formation device.

BACKGROUND ART

To adapt to increasingly stricter power consumption regulations, such as Energy Star, office appliance manufacturers are making efforts to reduce the power consumption of their own appliances. Lower power consumption, particularly, a low TEC value, which serves as an indicator of total power consumption, not just during operation but also during sleep and stand-by, can be a competitive advantage over other companies' appliances.

Patent Document 1 discloses an image formation device (multi-functional device) developed under such circumstances. This image formation device is configured such that an X capacitor for noise removal, provided in an alternating current power line for supplying power to a fixing heater, is disconnected when the image formation device operates in a sleep mode.

PRIOR ART DOCUMENT

Patent Document 1: Japanese Laid-Open Patent Publication No. 2021-21764

SUMMARY OF THE INVENTION

Problem to be Solved by the Invention

When power consumption tentatively increases during the operation in the sleep mode, the image formation device described above fails to perform the necessary noise removal due to the disconnection of the X capacitor. Note that the power consumption in the sleep mode temporarily increases, for example, when a USB memory containing print data is inserted into a USB port and data is exchanged between the USB memory and the image formation device.

The present invention has been made in view of the above circumstances, and a problem to be solved thereby is to provide a power supply device capable of achieving power savings in an image formation device without sacrificing necessary noise removal.

Means for Solving the Problem

To solve the above problem, the present invention pertains to a power supply device provided in an image formation device equipped with an image formation portion and a fixing heater portion, the power supply device including a filter portion, a main power supply portion configured to supply necessary power to the image formation portion by utilizing external alternating current power supplied via the filter portion, and a heater power supply portion configured to supply necessary power to the fixing heater portion by utilizing the external alternating current power supplied via the filter portion, wherein the filter portion includes a common line to which the external alternating current power is supplied, a first branch line connecting the common line and the main power supply portion, a second branch line connecting the common line and the heater power supply portion in a disconnectable manner, a first X capacitor provided at the common line, a second X capacitor provided at the first branch line in a disconnectable manner, and a third X capacitor provided at the second branch line and configured to be disconnected from the common line along with the heater power supply portion when the heater power supply portion is disconnected from the common line.

In this configuration, the first X capacitor is always connected to the common line of the filter portion. Accordingly, this configuration enables minimal necessary noise removal even when the second X capacitor and the third X capacitor are disconnected for loss reduction.

It is preferred that the second X capacitor is connected to the first branch line when the power supplied by the main power supply portion is greater than or equal to a preset first threshold, and is disconnected from the first branch line otherwise.

This configuration enables reliable removal of noise that increases with the rise in power supplied by the main power supply portion using two X capacitors.

In one aspect of the power supply device, the heater power supply portion and the third X capacitor may be connected to the common line when the image formation device's operating mode is a non-power-saving mode and a maintenance cover provided in the image formation device is closed, and be disconnected from the common line otherwise.

In this configuration, the third X capacitor is connected when the operating mode of the image formation device is a non-power-saving mode and the maintenance cover provided in the image formation device is closed, i.e., when noise is expected to increase. Accordingly, this configuration enables more reliable removal of the increased noise using three X capacitors.

In another aspect of the power supply device, the heater power supply portion and the third X capacitor are connected to the common line when the power supplied by the main power supply portion is greater than or equal to a preset second threshold (where the second threshold>the first threshold), and are disconnected from the common line otherwise.

This configuration also enables the reliable removal of noise that increases with the rise in power supplied by the main power supply portion using three X capacitors.

In the other aspect of the power supply device, the filter portion may further include a first relay connected in series with the second X capacitor and configured to close at a voltage greater than or equal to a preset third threshold, and a second relay inserted in the second branch line and configured to close at a voltage greater than or equal to a preset fourth threshold (where the fourth threshold>the third threshold), and a voltage proportional to the power supplied by the main power supply portion is applied to the first relay and to the second relay.

Alternatively, in the other aspect of the power supply device, the filter portion may further include a first relay connected in series with the second X capacitor, a second relay inserted in the second branch line and being identical to the first relay, a first Zener diode configured to conduct at a voltage greater than or equal to a preset fifth threshold, and a second Zener diode configured to conduct at a voltage greater than or equal to a preset sixth threshold (where the sixth threshold>the fifth threshold), and a voltage proportional to the power supplied by the main power supply portion is applied to the first relay via the first Zener diode and to the second relay via the second Zener diode.

When the first X capacitor has a large capacitance, losses increase in a power-saving mode, and when the third X capacitor has a small capacitance, sufficient noise removal cannot be achieved in non-power-saving modes. Therefore, in the power supply device, it is preferred that the second X capacitor has a capacitance greater than a capacitance of the first X capacitor and smaller than a capacitance of the third X capacitor.

Effect of the Invention

The present invention makes it possible to provide a power supply device capable of achieving power savings in an image formation device without sacrificing necessary noise removal.

MODES FOR CARRYING OUT THE INVENTION

Hereinafter, embodiments of a power supply device according to the present invention will be described with reference to the accompanying drawings.

First Embodiment

Figure 1:
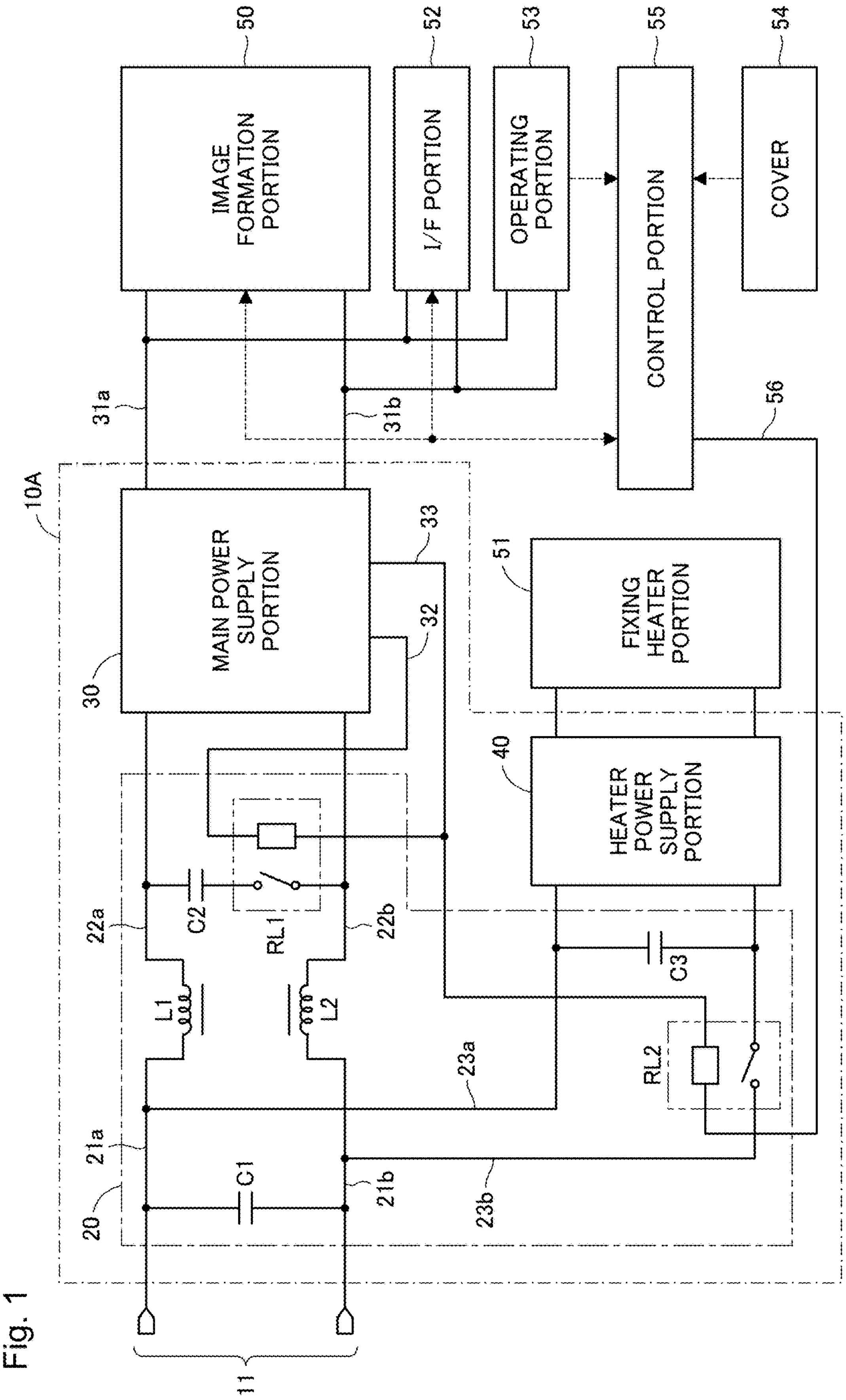
FIG. 1 is a diagram illustrating a power supply device according to a first embodiment of the present invention and peripheral components thereof.

FIG. 1 illustrates a power supply device 10A according to a first embodiment of the present invention. The power supply device 10A includes a filter portion 20, a main power supply portion 30, and a heater power supply portion 40. The power supply device 10A constitutes an image formation device, also called a multi-functional device, together with an image formation portion 50, which transfers and fixes an image onto paper while feeding the paper with rollers, a fixing heater portion 51 for fixation, an interface portion 52, which is a USB port or the like, an operating portion 53, which consists of a touch panel display, physical buttons, etc., a maintenance cover 54 (also simply referred to below as a "cover"), which is opened when replacing a toner cartridge or removing jammed paper, and a control portion 55, which controls the image formation portion 50 and other components based on, for example, user instructions received by the operating portion 53 and the open/closed state of the cover 54. The image formation device has operating modes such as a power saving mode (=sleep mode) and non-power-saving modes (=modes other than sleep mode; also referred to as "non-sleep modes").

The filter portion 20 is configured to perform noise removal to prevent noise generated in the main power supply portion 30 and other components from leaking out through an input terminal 11 connected to a commercial AC power source, and includes common lines 21_a_ and 21_b_ connected to the input terminal 11, first branch lines 22_a_ and 22_b_ connecting the common lines 21_a_ and 21_b_ with the main power supply portion 30, and second branch lines 23_a_ and 23_b_ connecting the common lines 21_a_ and 21_b_ with the heater power supply portion 40 in a disconnectable manner.

Furthermore, the filter portion 20 includes common-mode choke coils L1 and L2 inserted in the first branch lines 22_a_ and 22_b_, three film capacitors serving as X capacitors, which are a first X capacitor C1, a second X capacitor C2, and a third X capacitor C3, a first relay RL1 connected in series with the second X capacitor C2, and a second relay RL2 inserted in the second branch line 23_b_.

The first X capacitor C1 is connected to the common line 21_a_ at one terminal and to the common line 21_b_ at the other terminal. The first X capacitor C1 has a capacitance of 0.1 μF.

The second X capacitor C2 is connected to the first branch line 22_a_ at one terminal, closer to the main power supply portion 30 than is the common-mode choke coil L1, and to the first branch line 22_b_ via the first relay RL1 at the other terminal, closer to the main power supply portion 30 than is the common-mode choke coil L2. That is, the second X capacitor C2 is provided so as to be disconnectable from the first branch lines 22_a_ and 22_b_. The second X capacitor C2 has a capacitance of 0.22 μF.

The third X capacitor C3 is connected to the second branch line 23_a_ at one terminal and to the second branch line 23_b_ at the other terminal, closer to the heater power supply portion 40 than is the second relay RL2. That is, the third X capacitor C3 is disconnected from the common lines 21_a_ and 21_b_ along with the heater power supply portion 40 when the heater power supply portion 40 is disconnected from the common lines 21_a_ and 21_b_. The third X capacitor C3 has a capacitance of 2 μF.

The main power supply portion 30 is connected to the first branch lines 22_a_ and 22_b_ of the filter portion 20 and main output lines 31_a_ and 31_b_ extending to the image formation portion 50, the interface portion 52, and the operating portion 53. The main power supply portion 30 supplies necessary direct current power to the image formation portion 50, the interface portion 52, and the operating portion 53 by utilizing alternating current power supplied via the filter portion 20.

Figure 2:
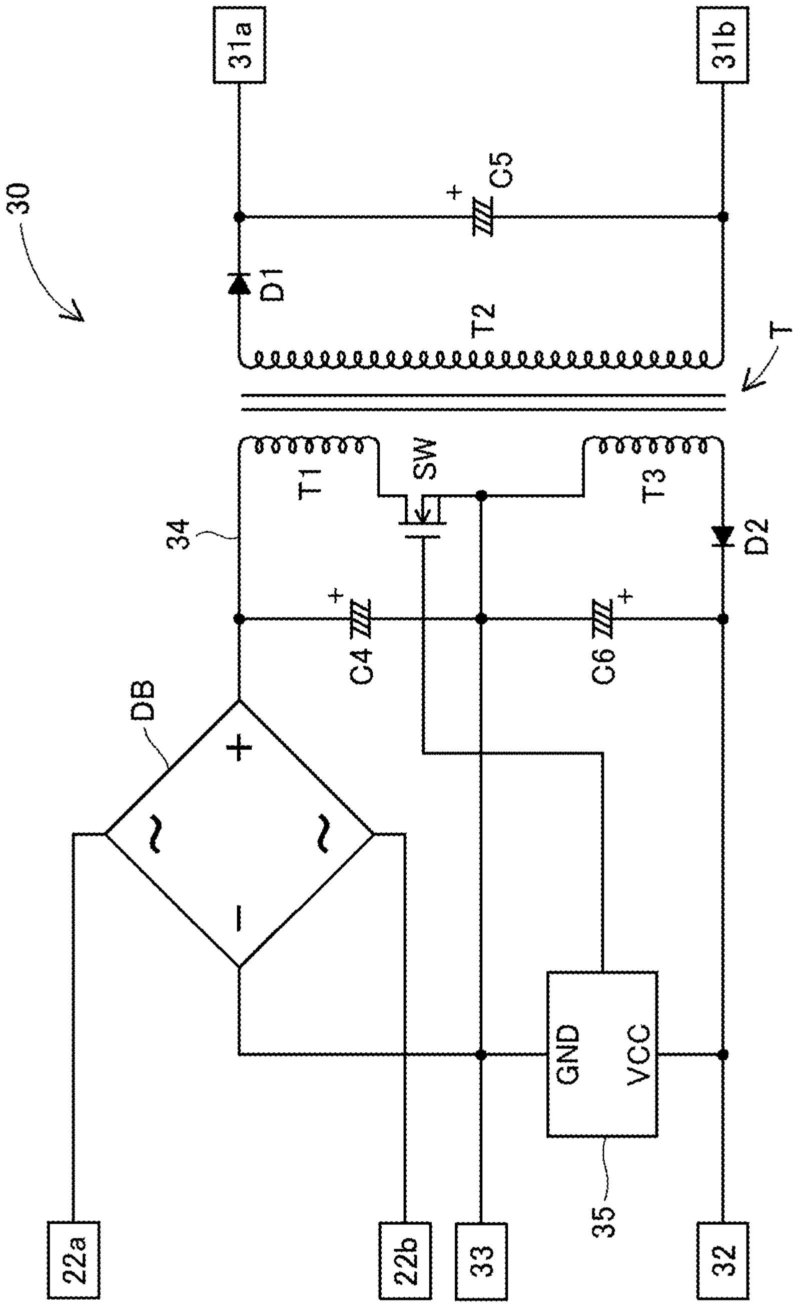
FIG. 2 is a circuit diagram illustrating a specific configuration of a main power supply portion shown in FIG. 1.

The main power supply portion 30 includes a diode bridge DB with an alternating current side connected to the first branch lines 22_a_ and 22_b_ and a direct current side connected to a reference line 33 and a direct current input line 34, a smoothing capacitor C4 with one terminal connected to the direct current input line 34 and the other terminal connected to the reference line 33, a primary winding T1 with one terminal connected to the direct current input line 34, and a switching element SW, which is a MOSFET, with a drain connected to the other terminal of the primary winding T1 and a source connected to the reference line 33, as shown in FIG. 2.

The main power supply portion 30 includes a secondary winding T2 with one terminal connected to the main output line 31_b_, a rectifier diode D1 with an anode connected to the other terminal of the secondary winding T2 and a cathode connected to the main output line 31_a_, and a smoothing capacitor C5 with one terminal connected to the main output line 31_a_ and the other terminal connected to the main output line 31_b_.

Furthermore, the main power supply portion 30 includes an auxiliary winding T3 with one terminal connected to the reference line 33, a rectifier diode D2 with an anode connected to the other terminal of the auxiliary winding T3 and a cathode connected to an auxiliary output line 32, a smoothing capacitor C6 with one terminal connected to the reference line 33 and the other terminal connected to the auxiliary output line 32, and a switching control portion 35, which operates using the voltage between the reference line 33 and the auxiliary output line 32 (referred to below as the "auxiliary voltage") as a power supply voltage.

The primary winding T1, the secondary winding T2, and the auxiliary winding T3 constitute a transformer T.

When the switching control portion 35 changes a gate-source voltage of the switching element SW to open or close the switching element SW, a voltage generated at the primary winding T1 changes, causing voltages generated at the secondary winding T2 and the auxiliary winding T3 to change as well. The voltage generated at the secondary winding T2 is rectified to direct current by the rectifier diode D1 and the smoothing capacitor C5. Moreover, the voltage generated at the auxiliary winding T3 is rectified to direct current by the rectifier diode D2 and the smoothing capacitor C6 and is used as the auxiliary voltage described earlier. The auxiliary voltage is approximately proportional to the power supplied by the main power supply portion 30 to the image formation portion 50 and other components via the main output lines 31*a* and 31*b* (referred to below as the "main output power").

The heater power supply portion 40 is connected to the second branch lines 23*a* and 23*b* of the filter portion 20 and to the fixing heater portion 51. The heater power supply portion 40 intermittently supplies power to the fixing heater portion 51 by utilizing the alternating current power supplied via the filter portion 20, thereby maintaining the fixing heater portion 51 at a predetermined temperature.

The auxiliary output line 32 and the reference line 33 of the main power supply portion 30 are connected to the first relay RL1. More specifically, the auxiliary output line 32 is connected to one terminal of a control coil included in the first relay RL1, and the reference line 33 is connected to the other terminal of the control coil in the first relay RL1.

The first relay RL1 is configured to be in closed state when the voltage between the reference line 33 and the auxiliary output line 32, i.e., the auxiliary voltage described earlier, is greater than or equal to a preset operating voltage, and to be in open sate otherwise. In the present embodiment, the operating voltage is set to "the auxiliary voltage when the main output power is 0.5 W (=a preset first threshold). Accordingly, the second X capacitor C2 is connected to the first branch lines 22*a* and 22*b* when the main output power is greater than or equal to 0.5 W, and is disconnected from the first branch lines 22*a* and 22*b* when the main output power is less than 0.5 W.

The second relay RL2 is connected to the reference line 33 of the main power supply portion 30 and a relay control line 56 extending from the control portion 55. More specifically, the reference line 33 is connected to one terminal of a control coil included in the second relay RL2, and the relay control line 56 is connected to the other terminal of the control coil in the second relay RL2.

The second relay RL2 is configured to be in closed state when the voltage between the reference line 33 and the relay control line 56 is greater than or equal to a preset operating voltage, and to be in open state otherwise. In the present embodiment, when the operating mode of the image formation device is a non-sleep mode and the cover 54 is closed, the control portion 55 raises the potential on the relay control line 56 until the voltage between the reference line 33 and the relay control line 56 reaches or exceeds the operating voltage. Accordingly, the third X capacitor C3 is connected to the common lines 21*a* and 21*b* via the second branch lines 23*a* and 23*b* and the second relay RL2 when the operating mode of the image formation device is a non-sleep mode and the cover 54 is closed, and is disconnected from the common lines 21*a* and 21*b* otherwise, i.e., when the operating mode of the image formation device is the sleep mode or when the operating mode of the image formation device is a non-sleep mode and the cover 54 is open.

It should be noted that in the present embodiment, the first relay RL1 and the second relay RL2 have the same operating voltage.

To summarize, the first X capacitor C1 is always connected to the common lines 21*a* and 21*b* regardless of the operating mode of the image formation device, the open/closed state of the cover 54, and the magnitude of the main output power, the second X capacitor C2 is connected to the first branch lines 22*a* and 22*b* when the main output power is greater than or equal to 0.5 W, regardless of the operating mode of the image formation device and the open/closed state of the cover 54, and the third X capacitor C3 is connected to the common lines 21*a* and 21*b* when the operating mode of the image formation device is a non-sleep mode and the cover 54 is closed, as indicated in Table 1.

TABLE 1

| Operating mode | Cover | Power supplied by main power supply portion (Main output power) | X capacitors C1 | C2 | C3 |
|---|---|---|---|---|---|
| Sleep | * | Less than 0.5 W | ○ | x | x |
| | | 0.5 W or higher | ○ | ○ | x |
| Non-sleep | Open | | ○ | ○ | x |
| | Closed | | ○ | ○ | ○ |

It should be noted that the operating mode of the image formation device switches from a non-sleep mode to the sleep mode, for example, when a certain period of time (for example, five minutes) elapses without the operating portion 53 being used or when a sleep button included in the operating portion 53 is pressed. Moreover, the operating mode of the image formation device switches from the sleep mode to a non-sleep mode, for example, when the operating portion 53 is used.

Thus, in the present embodiment, when the operating mode of the image formation device is the sleep mode and the main output power is less than 0.5 W, the second X capacitor C2 with a capacitance of 0.22 μF and the third X capacitor C3 with a capacitance of 2 μF are disconnected. That is, in the present embodiment, in such a situation, only the first X capacitor C1 with a capacitance of 0.1 μF is connected. Accordingly, the present embodiment makes it possible to minimize losses due to leakage current through the X capacitors.

Furthermore, in the present embodiment, when the main output power reaches or exceeds 0.5 W in the sleep mode, the second X capacitor C2, which has a higher capacitance than the first X capacitor C1, is connected. Accordingly, with these two X capacitors C1 and C2, the present embodiment can reduce noise that increases with the rise in main output power. Note that the main output power can exceed 0.5 W in the sleep mode, for example, when a USB memory is inserted into the interface portion 52 and data is exchanged between the USB memory and the image formation device.

Furthermore, in the present embodiment, when the operating mode is a non-sleep mode and the cover 54 is closed, the third X capacitor C3, which has an even higher capacitance than the second X capacitor C2, is connected. Accordingly, with the three X capacitors C1, C2, and C3, the present embodiment can reduce relatively large noise that might be generated when the image formation portion 50 forms and fixes an image on paper.

Second Embodiment

Figure 3:
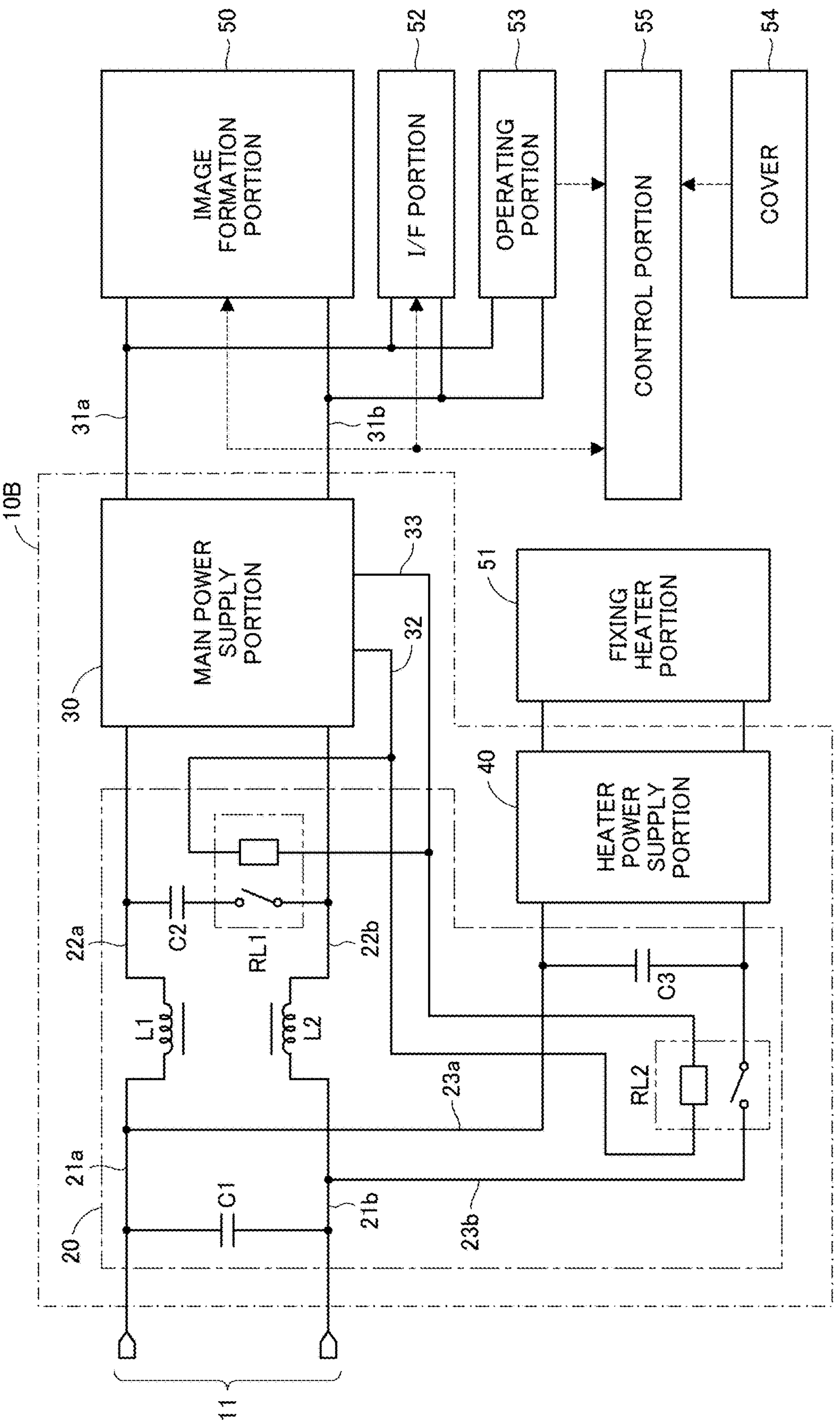
FIG. 3 is a diagram illustrating a power supply device according to a second embodiment of the present invention and peripheral components thereof.

FIG. 3 illustrates a power supply device 10B according to a second embodiment of the present invention. The power supply device 10B differs from the power supply device 10A in that the auxiliary output line 32 and the reference line 33 are connected to the second relay RL2 (specifically, the auxiliary output line 32 is connected to one terminal of the control coil included in the second relay RL2 and the reference line 33 is connected to the other terminal of the control coil), no relay control line 56 is included, the operating voltage of the first relay RL1 is a preset third threshold, and the operating voltage of the second relay RL2 is a preset fourth threshold (where the fourth threshold>the third threshold), but the power supply device 10B shares other features with the power supply device 10A.

The third threshold is set to "the auxiliary voltage when the main output power is 0.5 W (=the preset first threshold)". Moreover, the fourth threshold is set to "the auxiliary voltage when the main output power is 10 W (=a preset second threshold)". Accordingly, in the present embodiment, when the main output power is increased to 0.5 W or higher, the first relay RL1 is switched to closed state so that the second X capacitor C2 is connected, and when the main output power is further increased to 10 W or higher, the second relay RL2 is switched to closed state so that the third X capacitor C3 is connected.

Table 2 summarizes this.

TABLE 2

| Power supplied by main power supply portion (Main output power) | X capacitors C1 | C2 | C3 |
|---|---|---|---|
| Less than 0.5 W | ○ | x | x |
| 0.5 W to less than 10 W | ○ | ○ | x |
| 10 W or higher | ○ | ○ | ○ |

The present embodiment achieves similar effects to the first embodiment. That is, the present embodiment makes it possible to reduce losses due to leakage current through the X capacitors without sacrificing necessary noise removal.

Third Embodiment

Figure 4:
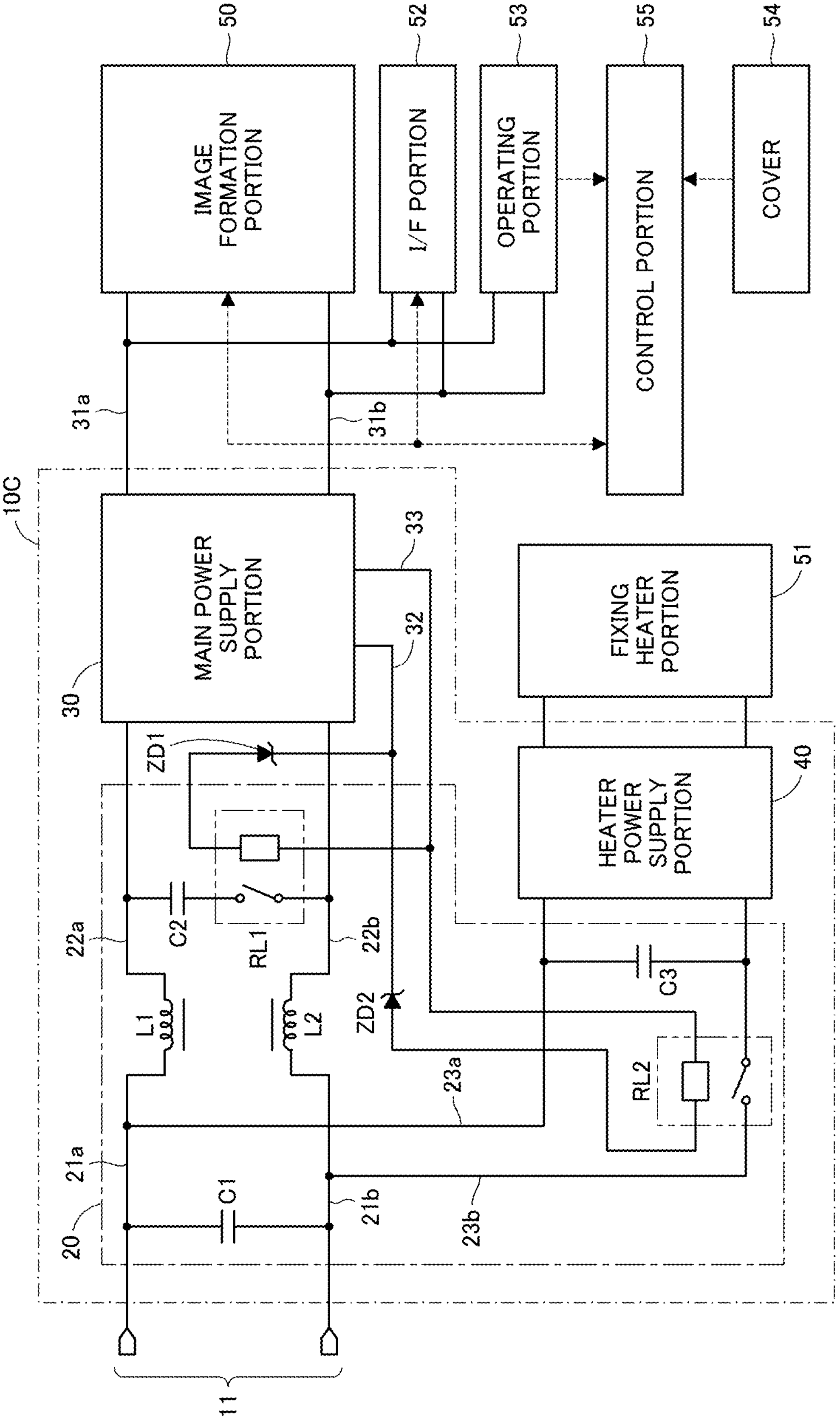
FIG. 4 is a diagram illustrating a power supply device according to a third embodiment of the present invention and peripheral components thereof.

FIG. 4 illustrates a power supply device 10C according to a third embodiment of the present invention. The power supply device 10C differs from the power supply device 10B in that the first relay RL1 and the second relay RL2 have the same operating voltage, and the filter portion 20 includes two Zener diodes ZD1 and ZD2, but the power supply device 10C shares other features with the power supply device 10B.

The first Zener diode ZD1 is inserted in the auxiliary output line 32 so as to be connected in series with the control coil of the first relay RL1, and becomes conductive at a voltage greater than or equal to a preset fifth threshold. Therefore, the first relay RL1 is switched to closed state when the auxiliary voltage reaches or exceeds a sum voltage of the operating voltage of the first relay RL1 and the fifth threshold. In the present embodiment, the operating voltage and the fifth threshold are set such that the sum voltage matches "the auxiliary voltage when the main output power is 0.5 W (=the preset first threshold)".

The second Zener diode ZD2 is inserted in the auxiliary output line 32 so as to be connected in series with the control coil of the second relay RL2, and becomes conductive at a voltage greater than or equal to a preset sixth threshold. Therefore, the second relay RL2 is switched to closed state when the auxiliary voltage reaches or exceeds a sum voltage of the operating voltage of the second relay RL2 and the sixth threshold. In the present embodiment, the operating voltage and the sixth threshold are set such that the sum voltage matches "the auxiliary voltage when the main output power is 10 W (=the preset second threshold)".

Therefore, in the present embodiment, as in the second embodiment, when the main output power is increased to 0.5 W or higher, the first relay RL1 is switched to closed state so that the second X capacitor C2 is connected, and when the main output power is further increased to 10 W or higher, the second relay RL2 is switched to closed state so that the third X capacitor C3 is connected (see Table 2).

The present embodiment achieves similar effects to the first and second embodiments. That is, the present embodiment makes it possible to reduce losses due to leakage current through the X capacitors without sacrificing necessary noise removal.

While the first through third embodiments of the power supply device according to the present invention have been described above, the present invention is not limited to these configurations.

[Variants]

For example, the first relay RL1 in each embodiment can be positioned between the second X capacitor C2 and the first branch line 22*a*.

Furthermore, the second relay RL2 in each embodiment can be inserted in the second branch line 23*a*.

Furthermore, the capacitances of the first X capacitor C1, the second X capacitor C2, and the third X capacitor C3 in each embodiment are merely illustrative and can be set arbitrarily in the present invention. However, the capacitance of the second X capacitor C2 is preferably greater than that of the first X capacitor C1 and smaller than that of the third X capacitor C3.

Furthermore, the first threshold and the second threshold in each embodiment are also merely illustrative and can be set arbitrarily in the present invention. However, the second threshold must be greater than the first threshold.

Furthermore, the main power supply portion 30 in each embodiment is not limited to the specific configuration shown in FIG. 2.

Furthermore, the main power supply portion 30 in each embodiment can be configured to supply necessary power only to the image formation portion 50 or supply necessary power to the image formation portion 50, the interface portion 52, the operating portion 53, and other components.

DESCRIPTION OF THE REFERENCE CHARACTERS

10A, 10B, 10C power supply device
11 input terminal
20 filter portion
21*a*, 21*b* common line
22*a*, 22*b* first branch line
23*a*, 23*b* second branch line
30 main power supply portion
31*a*, 31*b* main output line
32 auxiliary output line

33 reference line
34 direct current input line
35 switching control portion
40 heater power supply portion
50 image formation portion
51 fixing heater portion
52 interface portion
53 operating portion
54 cover
55 control portion
56 relay control line
C1 first X capacitor
C2 second X capacitor
C3 third X capacitor
C4, C5, C6 smoothing capacitor
D1, D2 rectifier diode
DB diode bridge
RL1 first relay
RL2 second relay
SW switching element
T transformer
T1 primary winding
T2 secondary winding
T3 auxiliary winding
ZD1 first Zener diode
ZD2 second Zener diode

The invention claimed is:

1. A power supply device provided in an image formation device equipped with an image formation portion and a fixing heater portion, comprising:

- a filter portion;
- a main power supply portion configured to supply necessary power to the image formation portion by utilizing external alternating current power supplied via the filter portion; and
- a heater power supply portion configured to supply necessary power to the fixing heater portion by utilizing the external alternating current power supplied via the filter portion, wherein,
- the filter portion includes:
  - a common line to which the external alternating current power is supplied;
  - a first branch line connecting the common line and the main power supply portion;
  - a second branch line connecting the common line and the heater power supply portion in a disconnectable manner;
  - a first X capacitor provided at the common line;
  - a second X capacitor provided at the first branch line in a disconnectable manner; and
  - a third X capacitor provided at the second branch line and configured to be disconnected from the common line along with the heater power supply portion when the heater power supply portion is disconnected from the common line.

2. The power supply device according to claim 1, wherein the second X capacitor is connected to the first branch line when the power supplied by the main power supply portion is greater than or equal to a preset first threshold, and is disconnected from the first branch line otherwise.

3. The power supply device according to claim 2, wherein the heater power supply portion and the third X capacitor are connected to the common line when the image formation device's operating mode is a non-power-saving mode and a maintenance cover provided in the image formation device is closed, and are disconnected from the common line otherwise.

4. The power supply device according to claim 2, wherein the heater power supply portion and the third X capacitor are connected to the common line when the power supplied by the main power supply portion is greater than or equal to a preset second threshold (where the second threshold>the first threshold), and are disconnected from the common line otherwise.

5. The power supply device according to claim 4, wherein,

- the filter portion further includes:
  - a first relay connected in series with the second X capacitor and configured to close at a voltage greater than or equal to a preset third threshold; and
  - a second relay inserted in the second branch line and configured to close at a voltage greater than or equal to a preset fourth threshold (where the fourth threshold>the third threshold), and
- a voltage proportional to the power supplied by the main power supply portion is applied to the first relay and to the second relay.

6. The power supply device according to claim 4, wherein,

- the filter portion further includes:
  - a first relay connected in series with the second X capacitor;
  - a second relay inserted in the second branch line and being identical to the first relay;
  - a first Zener diode configured to conduct at a voltage greater than or equal to a preset fifth threshold; and
  - a second Zener diode configured to conduct at a voltage greater than or equal to a preset sixth threshold (where the sixth threshold>the fifth threshold), and
- a voltage proportional to the power supplied by the main power supply portion is applied to the first relay via the first Zener diode and to the second relay via the second Zener diode.

7. The power supply device according to claim 1, wherein the second X capacitor has a capacitance greater than a capacitance of the first X capacitor and smaller than a capacitance of the third X capacitor.

* * * * *